(12) United States Patent
Oh et al.

(10) Patent No.: US 6,406,505 B1
(45) Date of Patent: Jun. 18, 2002

(54) VACUUM CLEANER HAVING A CYCLONE TYPE DUST COLLECTING APPARATUS

(75) Inventors: Jang-keun Oh; Kyu-chang Park; Jang-youn Ko, all of Kwangju (KR)

(73) Assignee: Samsung Kwangju Electronics Co., Ltd., Kwangju (KR)

( * ) Notice: Subject to any disclaimer, the term of this patent is extended or adjusted under 35 U.S.C. 154(b) by 5 days.

(21) Appl. No.: 09/758,904

(22) Filed: Jan. 10, 2001

(30) Foreign Application Priority Data

Aug. 7, 2000 (KR) ........................................ 2000-45658

(51) Int. Cl.[7] .............................................. B01D 45/12
(52) U.S. Cl. ........................ 55/337; 55/433; 55/459.1; 55/DIG. 3; 15/353
(58) Field of Search ........................ 55/337, 428, 432, 55/433, 459.1, DIG. 3; 15/350, 353

(56) References Cited

U.S. PATENT DOCUMENTS

| 2,432,757 | A | * | 12/1947 | Weniger ........................ 55/398 |
| 3,320,727 | A | | 5/1967 | Farley et al. .................. 55/337 |
| 3,696,591 | A | | 10/1972 | Bennett et al. ................ 55/337 |
| 4,268,288 | A | | 5/1981 | Coombs ....................... 55/337 |
| 5,230,722 | A | | 7/1993 | Yonkers ....................... 55/337 |
| 5,294,218 | A | | 3/1994 | Fiorentini .................... 406/173 |
| 5,525,396 | A | * | 6/1996 | Rudolph et al. ............. 428/131 |
| 5,681,363 | A | | 10/1997 | Tucker et al. ................ 55/300 |
| 5,858,038 | A | * | 1/1999 | Dyson et al. ................. 55/337 |
| 5,935,279 | A | * | 8/1999 | Kilstrom ...................... 15/350 |
| 6,090,174 | A | | 7/2000 | Douma ........................ 55/337 |
| 6,269,518 | B1 | * | 8/2001 | Yung ............................ 15/352 |

FOREIGN PATENT DOCUMENTS

| DE | 197 54 149 | 6/1998 |
| EP | 0 385 260 A1 | 5/1990 |
| EP | 0 489 468 A1 | 6/1992 |
| EP | 0 933 056 | 4/1999 |
| EP | 0 928 594 | 7/1999 |
| EP | 0 966 912 | 12/1999 |
| WO | WO 97/12660 | 4/1997 |
| WO | WO 00/21428 | 4/2000 |

OTHER PUBLICATIONS

Search Report issued Mar. 22, 2001 from the Dutch Industrial Property Office with respect to corresponding Dutch Patent Application No. 1017217.
Office Action issued May 23, 2001 from the Russian Patent Office with respect to corresponding Russian Application No. 2000126533.

* cited by examiner

Primary Examiner—Robert A. Hopkins
(74) Attorney, Agent, or Firm—Ladas & Parry

(57) ABSTRACT

A vacuum cleaner includes a cleaner body, a suction brush, through which air and contaminants are drawn in, and a cyclone type dust collecting device. The cleaner body has a motor driving chamber and a dust collecting chamber in communication with the motor driving chamber. The cyclone type dust collecting device is mounted in the dust collecting chamber and separates by centrifugal force the contaminants from the air. The cyclone type dust collecting device includes a hollow cylindrical cyclone body having an open top, a closed bottom, and a contaminant outlet. The open top allows air and contaminants into the cyclone body, where the contaminants are separated from the air by centrifugation. The contaminants are then discharged from the cyclone body through the contaminant outlet. The cyclone type dust collecting device further includes a contaminant receptacle for collecting the contaminants discharged through the contaminant outlet, a base member hingedly connected to the contaminant receptacle, and a cover for covering the top of the cyclone body. The cover has an air inlet passage, through which air and contaminants drawn in through the suction brush enter into the cyclone body, an air outlet passage, through which the air is discharged from the cyclone body, and a contaminant separating grill. The grill extends downward from the air outlet passage into the cyclone body and has a plurality of fine holes.

6 Claims, 3 Drawing Sheets

VACUUM CLEANER HAVING A CYCLONE TYPE DUST COLLECTING APPARATUS

BACKGROUND OF THE INVENTION

1. Field of the Invention

The present invention relates to a vacuum cleaner having a cyclone type dust collecting apparatus that separates by centrifugal force contaminants from the air that is drawn into the vacuum cleaner.

2. Description of the Related Art

Generally, vacuum cleaners such as upright type, canister type or the like, have a suction brush that is connected to the body of the vacuum cleaner and moves along on the cleaning surface. The body of the vacuum cleaner includes a dust collecting chamber, in which a dust filter is detachably mounted, and a motor driving chamber, in which a motor for generating the suction force is mounted. The suction force draws air and any dust or dirt on the cleaning surface into the cleaner body. The air is discharged from the cleaner after passing through the dust filter that is disposed in the dust collecting chamber of the cleaner body. The various contaminants in the air are filtered out by the dust filter, while the clean air is discharged to the environment.

The general vacuum cleaner described above, however, has a structure, in which contaminants are filtered and collected by an expendable dust filter. When the dust filter is clogged with contaminants, the filter has to be replaced, and a user must manually remove the used, dirty filter and insert a new one, which is both inconvenient and unhygienic.

SUMMARY OF THE INVENTION

The present invention has been made to overcome the above problems of the related art. Accordingly, it is an object of the present invention to provide a vacuum cleaner having a cyclone type dust collecting apparatus that is capable of separating by centrifugal force and collecting dust or contaminants from the air that is drawn in by a suction brush.

In accordance with the present invention, the above object is accomplished by a vacuum cleaner including a cleaner body, a suction brush, through which air and contaminants are drawn in, and a cyclone type dust collecting device. The cleaner body has a motor driving chamber and a dust collecting chamber in communication with the motor driving chamber. The cyclone type dust collecting device is mounted in the dust collecting chamber and separates by centrifugal force the contaminants from the air. The cyclone type dust collecting device includes a hollow cylindrical cyclone body having an open top, a closed bottom, and a contaminant outlet. The open top allows air and contaminants into the cyclone body, where the contaminants are separated from the air by centrifugation. The contaminants are then discharged from the cyclone body through the contaminant outlet. The cyclone type dust collecting device further includes a contaminant receptacle for collecting the contaminants discharged through the contaminant outlet, a base member hingedly connected to the contaminant receptacle, and a cover for covering the top of the cyclone body. The cover has an air inlet passage, through which air and contaminants drawn in through the suction brush enter into the cyclone body, an air outlet passage, through which the air is discharged from the cyclone body, and a contaminant separating grill. The grill extends downward from the air outlet passage into the cyclone body and has a plurality of fine holes.

BRIEF DESCRIPTION OF THE DRAWINGS

The above objects and other features and advantages of the present invention will become more apparent after a reading of the following detailed description in conjunction with the drawings, in which.

DETAILED DESCRIPTION OF PREFERRED EMBODIMENT

The present invention of a vacuum cleaner having a cyclone type dust collecting apparatus will be described in greater detail below with reference to accompanying drawings.

Figure 1:
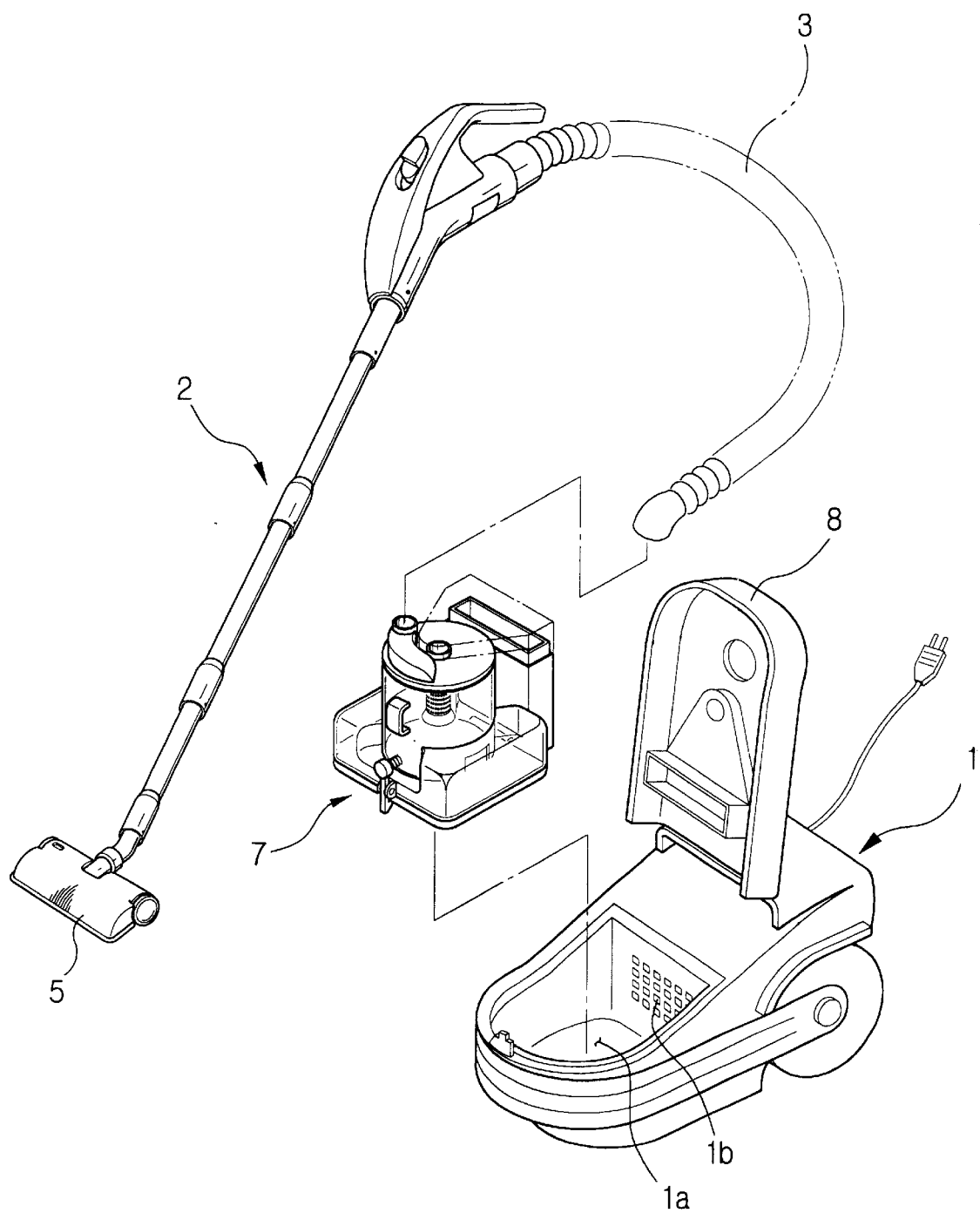
FIG. 1 is a perspective view illustrating a vacuum cleaner having a cyclone type dust collecting apparatus of the present invention.

FIG. 1 is a perspective view for schematically showing a vacuum cleaner having the cyclone type dust collecting apparatus of the present invention.

Referring to FIG. 1, the vacuum cleaner includes a body 1, a suction brush 5 that is connected to the body 1 through a connecting tube 2 and a connecting hose 3, and a cyclone dust collecting device 7.

The cleaner body 1 includes a dust collecting chamber 1a, in which the cyclone dust collecting device 7 is nested, and a motor driving chamber (not shown) in which a motor (not shown) is nested. The motor driving chamber and the dust collecting chamber 1a communicate with each other. The motor generates a strong suction force, which enables the suction brush 5 to draw in contaminants on the cleaning surface. The suction brush 5 is connected via the connecting tube 2 and the connecting hose 3 to dust collecting device, which is located in the dust collecting chamber 1a. Here, a cover 8 is attached to the cleaner body 1 to cover the cyclone dust collecting device 7, when the cyclone dust collecting device 7 is in the dust collecting chamber 1a. The cover 8 is opened and closed.

Figure 2:
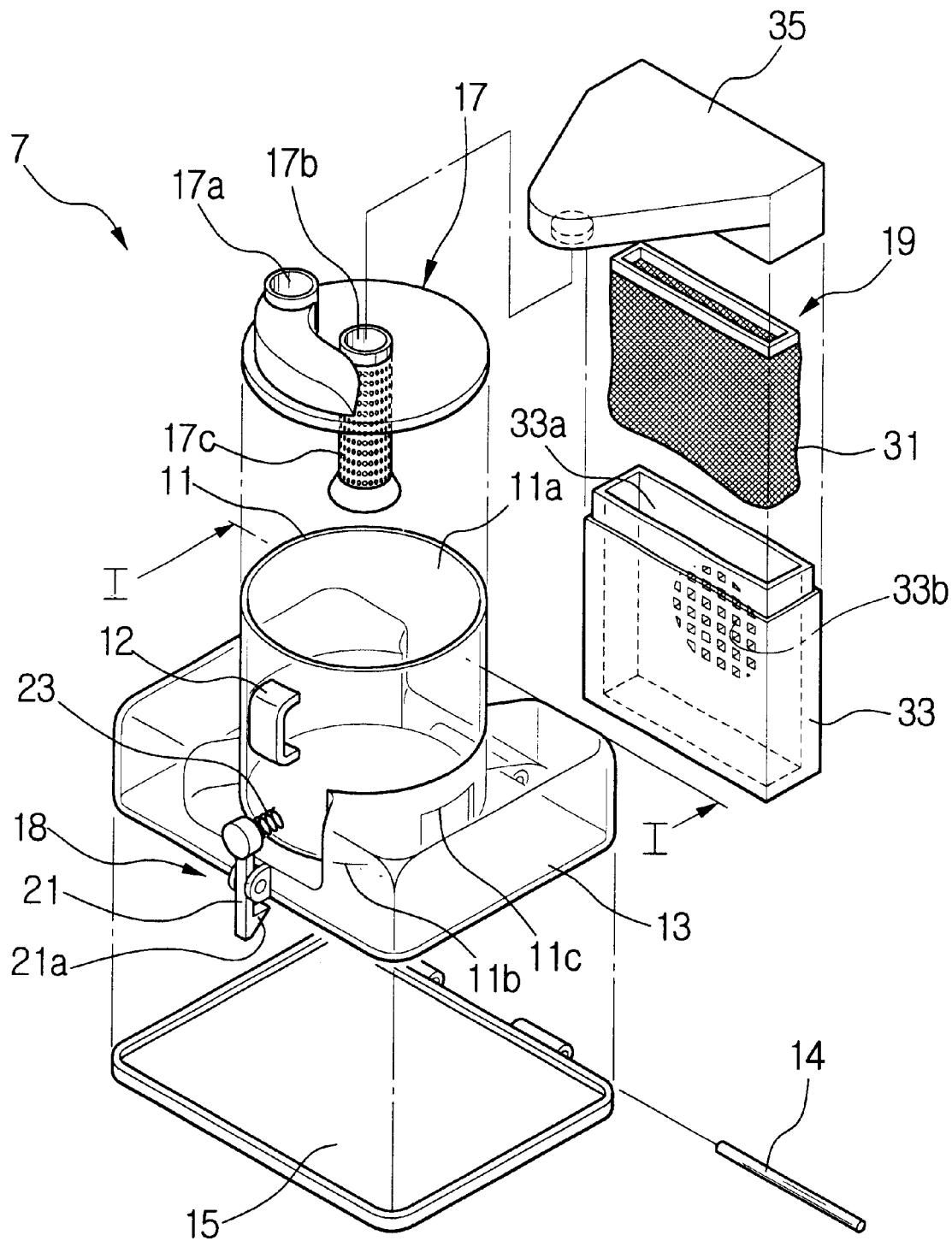
FIG. 2 is an exploded, perspective view illustrating the dust collecting apparatus of FIG. 1.
Figure 3:
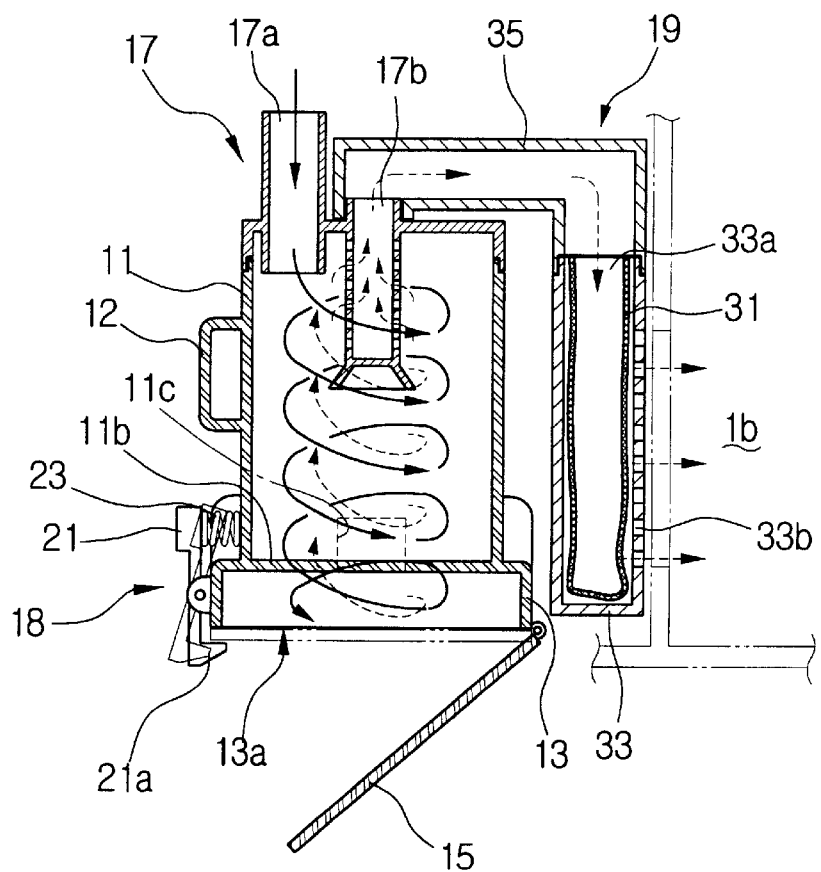
FIG. 3 is a sectional view illustrating the dust collecting apparatus of FIG. 2 in an assembled state.
Figure 4:
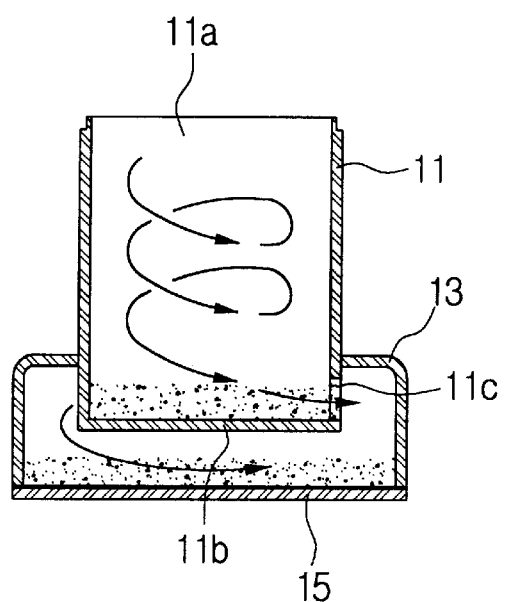
FIG. 4 is a cross-sectional view taken generally along the line I—I of FIG. 2.

The cyclone dust collecting device 7 separates by centrifugal force and collects contaminants from the air that is drawn into the vacuum cleaner through the suction brush 5. The cyclone dust collecting device 7 is detachably nested in the dust collecting chamber 1a. As shown in FIGS. 2, 3, and 4, the cyclone dust collecting device 7 includes a cyclone body 11, a contaminant receptacle 13, a base member 15, and a cover 17.

The cyclone body 11 has a substantially hollow cylindrical shape with a predetermined inner diameter. The cyclone body 11 includes an open top 11a and a closed bottom 11b. A handle 12 is formed on the outer surface of the cyclone body 11, and a contaminant outlet 11c of a certain size is formed on the lower portion of the cyclone body 11. Accordingly, contaminants in the air, which is drawn into the upper portion of the cyclone body 11, are separated from the air by centrifugation and discharged into the contaminant receptacle 13 through the contaminant outlet 11c.

The contaminant receptacle 13 serves as a collection place for the contaminants that have been discharged through the contaminant outlet 11c. Such a contaminant receptacle 13 covers the bottom 11b of the cyclone body 11 and partially surrounds the outer circumference of the cyclone body 11. The contaminant receptacle 13, which communicates with the cyclone body 11 exclusively through the contaminant outlet 11c, has an open bottom 13a.

The base member 15 is mounted on the lower end of the contaminant receptacle 13 to open or close the bottom 13a of the contaminant receptacle 13 and remove contaminants that have collected in the contaminant receptacle 13. The base member 15 is spaced apart from the bottom 11b of the cyclone body 11 by a predetermined distance. Accordingly, a predetermined space is defined between the base member 15 and the cyclone body 11. One end of the base member 15 is pivotally mounted on the lower portion of the contaminant receptacle 13 by a hinge shaft 14. As a result, in order to remove the contaminants collected in the contaminant receptacle 13, the base member 15 is pivoted about the pivot shaft 14 to open the bottom 13a of the contaminant receptacle 14 to permit the contaminants to be removed from the contaminant receptacle 13. For this purpose, a locking section 18 is also provided to lock or unlock the unhinged end of the base member 15 so as to permit the base member 15 to selectively cover or uncover the bottom 13a of the contaminant receptacle 13.

The locking section 18 includes a pivot member 21 having a hook 21a for contacting and supporting the unhinged end of the base member 15, and a spring 23. The pivot member 21 is pivotally mounted on the outer side of the contaminant receptacle 13 and elastically biased by the spring 23 in a manner such that the hook 21a of the pivot member 21 is positioned at the bottom 13a of the contaminant receptacle 13. Further, the spring 23 is disposed between the contaminant receptacle 13 and the pivot member 21 to bias the other end of the pivot member 21. Accordingly, as indicated by the two-dotted lines in FIG. 3, the base member 15 is locked in the hook 21a so as to cover the bottom 13a of the contaminant receptacle 13. That is, the base member 15 is locked with the hook 21a and, accordingly, covers the bottom 13a of the contaminant receptacle 13.

The cover 17 is connected to and covers the top 11a of the cyclone body 11. The cover 17 includes an air inlet passage 17a, an air outlet passage 17b, and a contaminant separating grill 17c, all of which communicate with the cyclone body 11. The air inlet passage 17a guides air, which is drawn in through the suction brush 5, the connecting tube 2 and the connecting hose 3, into the cyclone body 11. The air inlet passage 17a extends toward the interior of the cyclone body 11 to generate a vortex out of the air that is drawn into the cyclone body 11. After the air and the contaminants are drawn through the air inlet passage 17a, and the contaminants are separated from the air by centrifugation, the clean air is discharged through the air outlet passage 17b. The air outlet passage 17b is formed in the middle portion of the cover 17. The contaminant separating grill 17c extends downward from the air outlet passage 17b a predetermined depth into the cyclone body 11. The contaminant separating grill 17c has a plurality of fine holes for preventing the discharge of dust or contaminants.

Meanwhile, it is preferable that a filtering section 19 is further provided to filter the air which blows through the air outlet passage 17b toward the motor driving chamber 1b. The filtering section 19 includes an air filter 31, a filter case 33, and an air duct 35. The filter case 33, which houses the air filter 31, includes an air inlet 33a and an air outlet 33b. The air discharged from the air outlet passage 17b of the cyclone body 11 flows through the air inlet 33a, which is formed in the upper portion of the filter case 33. The air filter 31 is removably inserted into the filter case 33 through the air inlet passage 33a. The air outlet passage 33b is formed on the side of the filter case 33 that faces the motor driving chamber 1b, when the filter case 33 is mounted in the dust collecting chamber 1a. The air duct 35 connects the air outlet passage 17b with the air inlet 33a of the filter case 33. As shown in FIG. 1, the air duct 35 is formed on the door 8. Accordingly, by closing or opening the door 8, the air duct 35 can be respectively connected to or disconnected from the air outlet passage 17b and the air inlet 33a.

The operation of the cyclone type dust collecting apparatus of the present invention will be described below.

First, when the vacuum cleaner is on, the motor generates a strong suction force at the suction brush 5. This suction force draws in air and contaminants on the cleaning surface through the suction brush 5, connecting tube 2 and connecting hose 3, and into the cyclone body 11. Air is obliquely drawn into the cyclone body 11 by the air inlet passage 17a and descends into the cyclone body 11 while creating a vortex. Accordingly, the contaminants are separated from the air by the centrifugal force of the vortex, descend along the interior of the cyclone body 11, and are discharged to the contaminant receptacle 13 through the contaminant outlet 11c. Here, since the contaminants discharged into the contaminant receptacle 13 accumulate below the lower portion of the cyclone body 11, the reverse flow of contaminants into the cyclone body 11 through the contaminant outlet 11c, which is formed in the upper portion of the contaminant receptacle 13, is prevented.

Meanwhile, after the contaminants have been separated from the air, the clean air is discharged through the fine holes of the grill 17c and the air outlet passage 17b, and is drawn into the filter case 33 through the air duct 35. The air is then filtered as it passes through the air filter 31. Accordingly, even minute contaminants, which cannot be separated by the centrifugation, are captured by the air filter 31. The filtered air is then discharged to the environment after passing through the motor driving chamber 1b.

When the contaminant receptacle 13 is filled with contaminants, the user opens the door 8 on the cleaner body 1. The air duct 35, which is formed in the door 8, separates from the air outlet passage 17b of the cover 17 and the filter case 33. In this detached state, the user access the cyclone device 7 in the dust collecting chamber 1a. By pressing the end of the pivot lever 21, the hook 21a disengages from the end of the base member 15 and, as shown in FIG. 3, the base member 15 is free to open, exposing the bottom 13a of the contaminant receptacle 13. With the bottom 13a of the contaminant receptacle 13 open, the contaminants that have accumulated in the contaminant receptacle 13 can be removed. After dumping out the contaminants, the contaminant receptacle 13 can be closed by pushing the base member 15 up to the bottom of the 13a of the contaminant receptacle 13. The base member 15 is held in place by re-locking the hook 21a.

The air filter 31 can also be replaced by removing the old air filter and inserting a new one through the open air inlet 33a of the filter case 33.

Although the preferred embodiment of the present invention depicts a canister type vacuum cleaner (see FIG. 1), it will be clearly understood that the cyclone type dust collecting apparatus of the present invention also can be employed in other types of vacuum cleaners, such as the upright type vacuum cleaners or the like.

As described above, in the cyclone type dust collecting apparatus of the present invention, since the contaminant receptacle is located below the lower portion of the cyclone body 11, the contaminants that have been discharged into the contaminant receptacle 13 cannot flow back into the cyclone body 11.

In addition, the present invention improves the cleaning efficiency of the vacuum cleaner by providing a two-step contamination separation process. The contaminants are first separated from the air by centrifugation in the cyclone body 11. After that, minute contaminants, which were not separated during the centrifugation process, are captured by the filtering section 19.

What is claimed is:

1. A vacuum cleaner comprising:

a cleaner body having a motor driving chamber and a dust collecting chamber in communication with the motor driving chamber;

a suction brush through which contaminants and air are drawn in; and cyclone type dust collecting means mounted in the dust collecting chamber for separating the contaminants from the air by a centrifugation, the cyclone type dust collecting means comprising:

a hollow cylindrical cyclone body having an open top, a closed bottom, and a contaminant outlet, the open top allowing air and contaminants into the cyclone body, the cyclone body separating contaminants from the air by centrifugation, the contaminant outlet allowing the contaminants that have been separated from the air by centrifugation to pass through;

a contaminant receptacle covering the bottom and a portion of an outer surface of the cyclone body, the contaminant receptacle collecting the contaminants discharged through the contaminant outlet;

a base member pivotally coupled to the bottom of the contaminant receptacle; and a cover for covering the top of the cyclone body, the cover having an air inlet passage through which air and contaminants drawn in through the suction brush enter into the cyclone body, an air outlet passage through which the air is discharged from the cyclone body, and a contaminant separating grill, the grill extending downward from the air outlet passage and having a plurality of fine holes.

2. The vacuum cleaner of claim 1, further comprising filtering means for filtering the air which is discharged through the air outlet.

3. The vacuum cleaner of claim 2, wherein the filtering means comprises:

an air filter;

a filter case housing the air filter, the filter case having an air inlet and an air outlet, the air outlet communicating with the motor driving chamber, the filter case being mounted in the dust collecting chamber; and an air duct for connecting the air outlet passage to the air inlet of the filter case.

4. The vacuum cleaner of claim 3, wherein the air duct is formed in a door of the vacuum cleaner, the door being hingedly connected to the cleaner body to open or close the dust collecting chamber, wherein the air duct is disconnected from or connected to the air outlet passage and air inlet when the door is opened or closed, respectively.

5. The vacuum cleaner of claim 1, wherein one end of the base member is hingedly connected on a lower end of the contaminant receptacle, while the other end of the base member connected to the contaminant receptacle by a locking means, whereby the bottom of the contaminant receptacle is closed or opened by respectively locking or unlocking the base member.

6. The vacuum cleaner of claim 5, wherein the locking means comprises:

a pivot member pivotally formed on an outer side of the contaminant receptacle, the pivot member having a hook formed on one end for preventing a free fall of the end of the base member; and a spring for biasing the pivot member in a manner such that the hook supports the base member.

* * * * *